Nov. 6, 1962  B. T. G. BISHOP  3,062,050
GAS TURBINES
Filed April 13, 1960
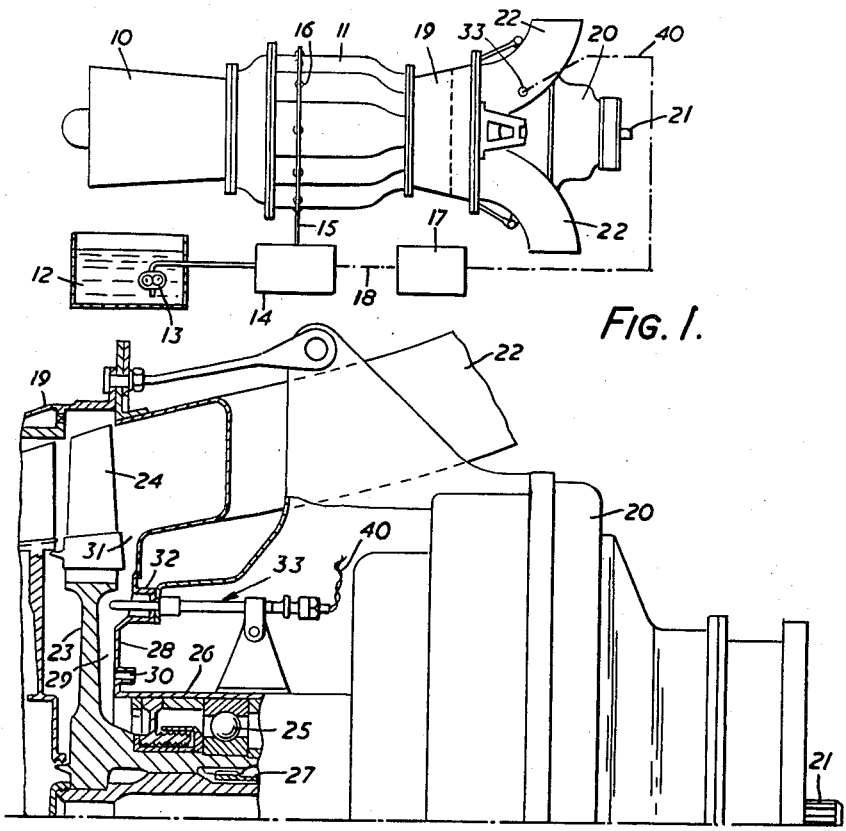
FIG. 1.
FIG. 2.
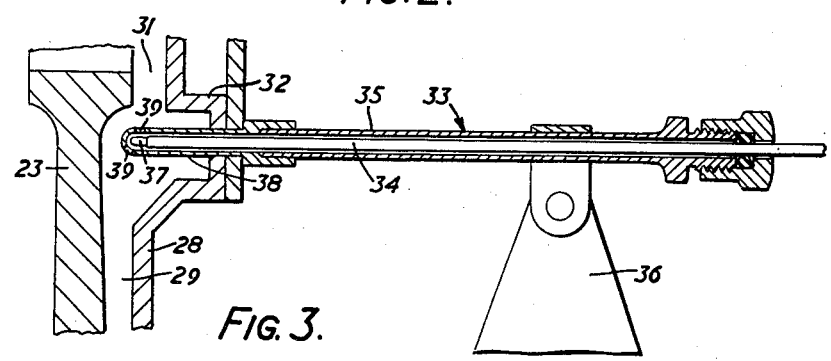
FIG. 3.
INVENTOR
BASIL T. G. BISHOP
BY
Watson, Cole, Grindle + Watson
ATTORNEYS 3,062,050
Patented Nov. 6, 1962

3,062,050
GAS TURBINES
Basil Thomas George Bishop, London, England, assignor to D. Napier & Son Limited, London, England, a company of Great Britain
Filed Apr. 13, 1960, Ser. No. 21,980
Claims priority, application Great Britain Apr. 15, 1959
1 Claim. (Cl. 73—347)

This invention relates to gas turbines, of the kind in which the rotor is in the form of a disc and there is at least one passage partly bounded by the rotor disc and through which a coolant is caused to flow.

It is an object of the invention to provide in a gas turbine of the kind specified apparatus for monitoring the rotor cooling system so that a warning can be given, or appropriate correcting action taken automatically, in the event of a complete or partial interruption in the flow of coolant through the passage.

According to the present invention, in a gas turbine of the kind specified a temperature-sensing device is disposed in the said passage.

In normal operation when the cooling system is working properly the temperature of the coolant flowing past the temperature-sensing device will remain within a certain range. On the other hand, a complete or partial interruption in the flow of coolant will produce a rapid rise in temperature in the passage. Moreover, in cases where the coolant is discharged into the stream of hot turbine gases an interruption in the flow of coolant may permit hot gas to leak into the coolant passage. In either case a substantial rise in the temperature will be sensed by the temperature-sensing device.

The response of the temperature-sensitive device to such a rise in temperature can be utilised in any desired manner. For example, it could be utilised to give a warning signal or to provide an automatic correcting action, for instance by automatically shutting off or reducing the fuel supply to a combustion chamber which generates the gases which flow through the turbine.

Preferably, the temperature-sensing device is shrouded so that it is shielded from direct radiation from the turbine disc but is exposed to a fluid medium (i.e. the coolant or hot gases) flowing through the said passage.

Conveniently, the temperature-sensing device is a thermocouple, but other forms of temperature-sensing device could be used, for example a bimetal strip or a resistor having a suitable resistance-temperature coefficient.

Where a thermocouple is employed, one junction of the thermocouple is conveniently enclosed within a thimble tube which provides the anti-radiation shield, and which has perforations aligned with the direction of flow of the coolant through the said passage whereby some of the coolant can flow through the thimble tube in contact with the said junction of the thermocouple.

The invention also extends to a temperature-sensing device suitable for use in a gas turbine of the kind specified, the temperature-sensing device comprising a temperature-sensitive element enclosed within a perforated shroud which shields the said element against direct radiation, the perforations permitting a fluid medium to flow through the shroud in contact with the said element.

The invention may be performed in vairous ways, and a specific embodiment will now be described by way of example with reference to the accompanying drawings, in which:

FIGURE 1 is a side view of a gas turbine power unit embodying the present invention;

FIGURE 2 is a sectional view of a portion of the turbine and adjacent parts of the power unit, on a larger scale; and FIGURE 3 is a sectional view of the temperature-sensing device on a still larger scale.

The gas turbine power unit shown in FIGURE 1 comprises an axial flow air compressor 10 wich draws in air from the atmosphere, compresses it, and delivers it in a compressed state into combustion chambers 11, where it supports combustion of a fuel. The fuel is pumped from a tank 12 by a pump 13 and delivered through a metering unit 14 and fuel lines 15 to burners 16 in the combustion chambers 11. The fuel metering unit 14 is of conventional construction, and serves to regulate the supply of fuel to the burners 16. It is equipped with means for reducing the supply of fuel automatically on receipt of a suitable input signal through a line 18 from an emergency fuel limiting device 17 such as a servo-motor of conventional construction.

The hot gases from the combustion chambers 11 pass through a turbine casing 19 wherein they expand, giving up energy to two turbines. The first turbine, situated to the left of the dotted line in the turbine casing 19 in FIGURE 1, serves to drive the compressor 10. The second turbine, situated to the right of the said dotted line, serves to provide the useful power of the gas turbine plant, which is transmitted through a reduction gearbox 20 to an output shaft 21. The turbine exhaust gases are discharged through ducts 22.

Referring to FIGURE 2, the second turbine contained in the right-hand part of the casing 19 comprises a disc 23 provided with blades 24. The disc 23 is supported in a bearing 25 mounted in a sleeve 26 which forms part of the casing structure of the gas turbine. The disc 23 is also connected by means of a driving shaft assembly 27 with reduction gearing contained in the gear box 20.

The said casing structure has an end wall 28 which faces the rear surface of the disc 23 and which is spaced therefrom by a passage 29. A coolant, for instance air tapped off from one of the earlier stages of the compressor 10, is introduced into the passage 29 through a series of apertures 30 in the end wall 28, one of which apertures is visible in FIGURE 2. The coolant flows radially outwards over the rear surface of the disc 23, and then through an annular gap 31 into the exhaust duct 22 at the root of the ring of blades 24.

Fitted into a well 32 in the end wall 28 is a temperature-sensing device 33 which is shown in more detail in FIGURE 3. This device comprises a thermocouple 34 contained in a tube 35 supported from the casing sleeve 26 on a bracket 36. One junction 37 of the thermocouple projects into the passage 29 and is shielded from direct radiation from the turbine disc 23 by means of a shroud in the form of a perforated thimble tube 38. The perforations 39 of the thimble tube are disposed so as to permit a portion of the coolant flowing through the passage 29 to enter the thimble tube and come into contact with the thermocouple junction 37. The leads 40 (FIGURES 1 and 2) from the thermocouple 34 emerge from the rear end thereof and pass to a suitable indicating or control device. In the embodiment illustrated, the leads pass to the emergency fuel limiting device 17.

The apparatus works as follows. In normal operation a supply of relatively cool air enters the passage 29 through the apertures 30 and flows radially outwards over the turbine disc 23, thereby keeping this disc cool. Also, the cooling air emerging through the annular gap 31 prevents hot turbine exhaust gases from entering the passage 29. A portion of the coolant flows through the perforations 39 of the thimble tube in contact with the thermocouple junction 37 and keeps this junction relatively cool. In the event of failure of the cooling air supply, the flow of cool air over the thermocouple junction 37 ceases. Also, the thimble tube 38 is no longer cooled, and is rapidly heated by radiation from the hot turbine disc 23. This in turn raises the temperature of the junction 37. Simultaneously, there may be some leakage of hot turbine exhaust gases into the passage 29 through the gap 31. Some of these hot gases would flow through the perforations 39 and heat the junction 37 directly. The rise in temperature of the thermocouple junction 37 is signalled through the leads 40 to the emergency fuel limiting device 17 which thereupon acts upon the fuel metering unit 14 to reduce the supply of fuel to the burners 16.

What I claim as my invention and desire to secure by Letters Patent is:

A gas turbine comprising wall means defining an annular passage for hot turbine-driving gases, a turbine having a rotor in the form of a disc and blades mounted around the periphery of said disc in said annular passage, further wall means spaced from said disc and defining therewith at least one coolant passage communicating with said annular passage adjacent said periphery of said disc, means for causing a coolant to flow through said coolant passage into said annular passage, and a temperature-sensing device disposed in said coolant passage adjacent said periphery of said disc.

References Cited in the file of this patent

UNITED STATES PATENTS 2,798,893   Winkler   July 9, 1957

FOREIGN PATENTS 784,597   Great Britain   Oct. 9, 1957